June 15, 1926.
L. A. WILLIS
GARDEN IMPLEMENT
Filed May 13, 1925
1,588,927
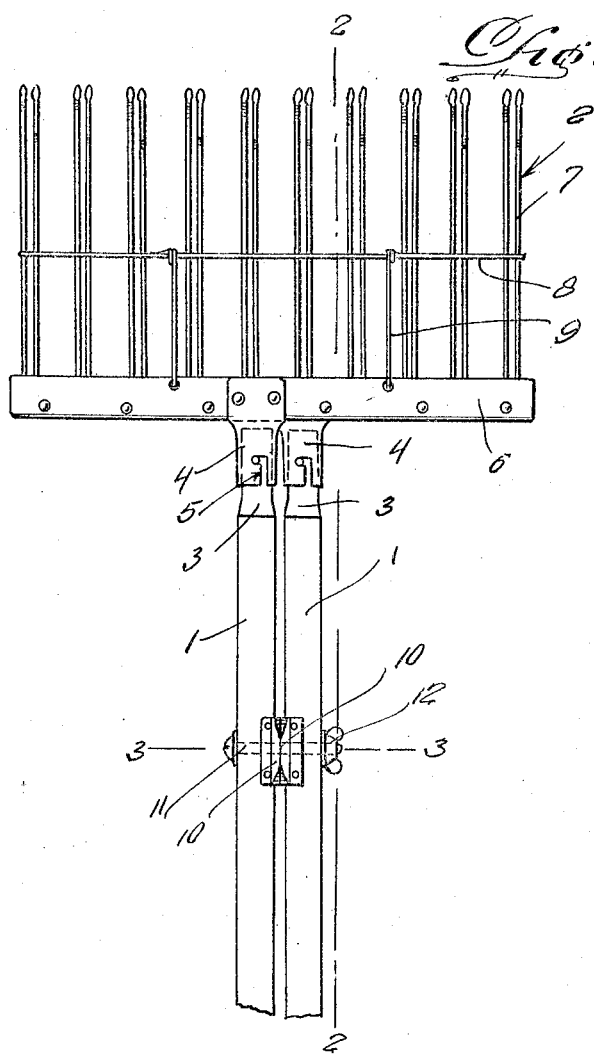
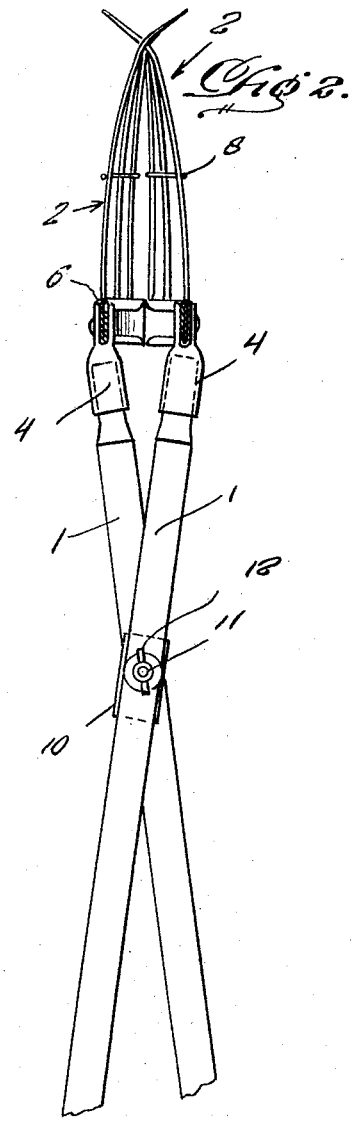
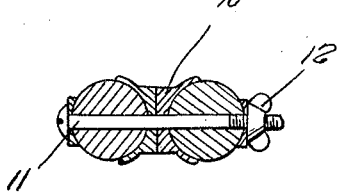
Inventor
L. A. Willis,
By Clarence A. O'Brien
Attorney Patented June 15, 1926.

1,588,927

UNITED STATES PATENT OFFICE.

LUKE A. WILLIS, OF ORLANDO, FLORIDA.

GARDEN IMPLEMENT.

Application filed May 13, 1925. Serial No. 30,111.

This invention relates to an improved device which may be broadly referred to as a garden implement, although it is not to be restricted to this particular use, since it is quite advantageous in other capacities.

The purpose of the invention is to provide a simple implement which is so constructed as to provide a rake, a pitch fork, and a device for picking up material.

An important object is to generally improve upon similar patented and marketed devices of this class by providing one of comparative simplicity and durability, which is of such construction as to render it more practical in operation and use, and yet not quite as expensive to both the manufacturer and user.

More particularly, the invention relates to a device, which comprises a pair of substantially duplicate members including handles hingedly connected together, so that the device may be very efficiently used as a rake, pitchfork, and lifting device for grass and materials of a similar nature.

Other objects and advantages of the invention will become apparent from the following description and drawings:

In the accompanying drawing, forming a part of this application, and in which like numerals are employed to designate like parts throughout the same:

Figure 1 is a plan view of an implement constructed in accordance with the present invention.

Figure 2 is a side view.

Figure 3 is an enlarged detail section, taken approximately upon the plane of the line 3—3 of Figure 1.

In carrying out the invention, I employ a structure, which, as before stated, embodies a pair of substantially duplicate parts. Each part comprises a handle 1 having a head 2 detachably connected to the outer end thereof. In this connection, it will be observed that the outer end of the handle is reduced, as at 3, and fits into a socket 4, on a coupling member. A bayonet slot and pin connection 5 is preferably provided here to permit the coupling to be detached. The couplings are provided with bifurcated ends, the furcations of which straddle the backing members 6 of the aforesaid heads 2. These heads 2 embody a plurality of longitudinally bowed curved wire fingers 7, similar to those used on implements of this class. The fingers are spaced apart, and a bracing member 8 is connected therewith and with the backing member as indicated at 9, to afford rigidity of structure.

In this connection, it is to be stated that the two handles 1 are arranged in crossed relation, as indicated in Figure 2, and are pivotally connected together as to bring the two heads 2, opposite each other. Also, the fingers on the respective heads are arranged in staggered relation, so that they may swing between each other, as indicated in Figure 2, to allow the heads to be moved into comparatively close relation for lifting comparatively small objects.

From Figure 3, it will be observed that a wear plate 10 is provided with a socket, and the inner side of the rounded handle is fitted into this socket, the flattened faces of the respective plates being fitted against each other. A bolt 11 is passed through the handles and plates and a thumb nut 12 is placed on the threaded end thereof to bind the two handles together, to allow free swinging or to permit them to be locked in different relative angular positions.

It is obvious that by swinging one of the devices away from the other, the latter will be free to permit it to be used as a rake or as a pitch fork. Then, by swinging the two heads 2 together, grass or the like may be literally clamped therebetween and lifted and carried to a suitable source of deposit.

It is also obvious that the two members may be disconnected and only one of them used at a time. Furthermore, the heads may be removed to render the structure compact.

It is thought that by considering the description in connection with the drawings, persons familiar with devices of this class will be able to obtain a clear understanding of the same. Therefore, a more lengthy description is thought unnecessary.

While the preferred embodiment of the invention has been shown and described, it is to be understood that minor changes coming within the field of invention claimed may be resorted to, if desired.

I claim:

Means for connecting a pair of implement handles together, wherein said handles are arranged in side-by-side crossed relation and are detachably connected at their outer ends with a pair of duplicate toothed heads disposed in opposed relation, said means comprising a pair of duplicate castings each including a wear compensating disc and an elongated channel, the discs being disposed in movable contact and the channels being arranged for reception of the handles, and a bolt passing through the handles and castings, said bolt being provided with a retaining nut.

In testimony whereof I affix my signature.

LUKE A. WILLIS.